United States Patent
Tsai (10) Patent No.: US 8,164,487 B1
(45) Date of Patent: Apr. 24, 2012

(54) SYSTEM, MODULE, AND METHOD FOR PRESENTING MESSAGES TO A PILOT OF AN AIRCRAFT

(75) Inventor: Hung-i B. Tsai, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 425 days.

(21) Appl. No.: 12/562,252

(22) Filed: Sep. 18, 2009

(51) Int. Cl.
*G01C 23/00* (2006.01)

(52) U.S. Cl. ........ 340/971; 340/988; 340/945; 340/951; 340/952; 340/574; 340/967; 455/431; 455/404.1; 455/412.2; 455/437

(58) Field of Classification Search ................... 340/971, 340/988, 945, 951, 952, 574, 967; 455/404.1, 455/431, 435, 412.2, 437
See application file for complete search history.

(56) References Cited

U.S. PATENT DOCUMENTS

| | | | | |
|---|---|---|---|---|
| 6,844,817 B2 * | 1/2005 | Gleine | ........................... | 340/574 |
| 6,885,313 B2 * | 4/2005 | Selk et al. | ..................... | 340/945 |
| 2003/0048203 A1 * | 3/2003 | Clary et al. | .................... | 340/945 |

* cited by examiner

*Primary Examiner* — Tai T Nguyen
(74) *Attorney, Agent, or Firm* — Donna P. Suchy; Daniel M. Barbieri (57) ABSTRACT

A present novel and non-trivial system, module, and method for presenting messages to a pilot of an aircraft are disclosed. The system comprises a source for providing message data, a message generating ("MG") processor, and a presentation system. Message data received from a message data source includes data fields for providing message location on a flight plan and one or more modes of presentation. After receiving the message data, an MG processor generates a message presentation data set corresponding to the message data; the message presentation data set represents a message object shown at the message location on a flight plan and at least one presentation mode. Then, a presentation system receives the message presentation data set and presents the information contained in such data set to one or more units of the presentation system including a visual display unit and/or an aural alert unit.

21 Claims, 8 Drawing Sheets

SYSTEM, MODULE, AND METHOD FOR PRESENTING MESSAGES TO A PILOT OF AN AIRCRAFT

BACKGROUND OF THE INVENTION

1. Field of the Invention

This invention pertains generally to the field of display units and/or crew alerting units that provide flight plan information to the pilot or flight crew of an aircraft.

2. Description of the Related Art

Note taking for a pilot is a ubiquitous activity. Notes are used as reminders and may be taken using a variety of forms including, but not limited to, pen, pencil, paper, grease pens, and erasing boards. When using paper, it is not uncommon for the pilot to drop the paper on the floor where it could end up under the seat, thus making retrieval a chore. Another form is a sticky notepad such as a Post-It® Note manufactured by 3M where the pilot may place the sticky pad on the face and/or edge of a display unit or elsewhere to remind him or her to do a specific task at a later time. Occasionally, the sticky pad may fall off and/or leave a gummy residue. In an aircraft operating with two or more flight crew members, one pilot may take a note in his or her own shorthand, and pass the note to the other pilot who is not knowledgeable of the other's shorthand.

Presently, it is possible for a pilot use a label associated in the creation and/or modification of a waypoint for note taking; however, the entire message may be truncated due to a lack of message field width. Also, the uninterrupted on-screen appearance of the label takes up screen space and may cause a cluttering effect with the depiction of other symbology displayed on a display unit. Also, the use of a waypoint for note taking is not tied to an aural alert unit for reminding a pilot when the time for taking action as described in the note is forthcoming or has arrived.

BRIEF SUMMARY OF THE INVENTION

The embodiments disclosed herein present at least one novel and non-trivial system, module, and method for presenting messages to the pilot or air crew of an aircraft. The use of a message object, a note, a visual alert and/or an aural alert may be used to assist the pilot during the operation of an aircraft.

In one embodiment, a system is disclosed for presenting messages to a pilot of an aircraft. The system comprises a source for providing message data, a message generating ("MG") processor, and a presentation system. A source for providing message data may be a manual input device and/a datalink system. Message data could be received from a message data source. The message data includes data fields for providing message location on a flight plan and one or more modes of presentation. The identification of a message location could include, but not limited to, a time offset of a waypoint, a distance offset of a waypoint, a location on the flight plan corresponding to a time, and/or a latitude/longitude. A mode of presentation could include, but not limited to, a note, a text alert, and/or an aural alert. After receiving the message data, an MG processor could generate a message presentation data set corresponding to the message data; the message data set represents a message object shown at the message location on a flight plan and at least one presentation mode. Then, an MG processor could provide the message presentation data set to a presentation system. A presentation system could present the message object on the flight plan on one or more visual display units, and the message object could include an on-screen label. In an additional embodiment, a visual display unit could present a note and/or a text alert, and an aural alert unit could present an aural alert.

In another embodiment, a module is disclosed for presenting messages to a pilot of an aircraft, where a module could be, but is not limited to, a printed circuit board (either in whole or in part) installed in a line replaceable unit. The module comprises an input communications interface, an MG processor, and an output communications interface. Message data as described above could be received from a message data source, where the message data includes data fields for providing message location on a flight plan and one or more modes of presentation. After receiving the message data, an MG processor could generate a message presentation data set corresponding to the message data as described above. Then, an MG processor could provide the message presentation data set to a presentation system, where the message object on the flight plan represented in the message presentation data set could be depicted on one or more visual display units, and the message object could include an on-screen label. In an additional embodiment, a text alert and/or an aural alert could be presented on a visual display unit or through an aural alert, respectively.

In another embodiment, a method is disclosed for presenting messages to a pilot of an aircraft. The method comprises receiving message data from a message data source, where the message data includes data fields for providing message location on a flight plan and one or more modes of presentation. Then, the method continues with the generating of a message presentation data set corresponding to the message data as described above. Then, method continues with the providing of the message presentation data set to a presentation system, where the message object on the flight plan represented in the message presentation data set could be depicted on one or more visual display units, and the message object could include an on-screen label. In an additional embodiment, a text alert and/or an aural alert could be presented on a visual display unit or through an aural alert, respectively.

BRIEF DESCRIPTION OF THE DRAWINGS

The drawings of FIGS. 2A through 2C provide exemplary depictions of a flight plan presented on a strategic display unit.

The drawings of FIGS. 2E through 2F provide exemplary depictions of dialog boxes presented on a strategic display unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
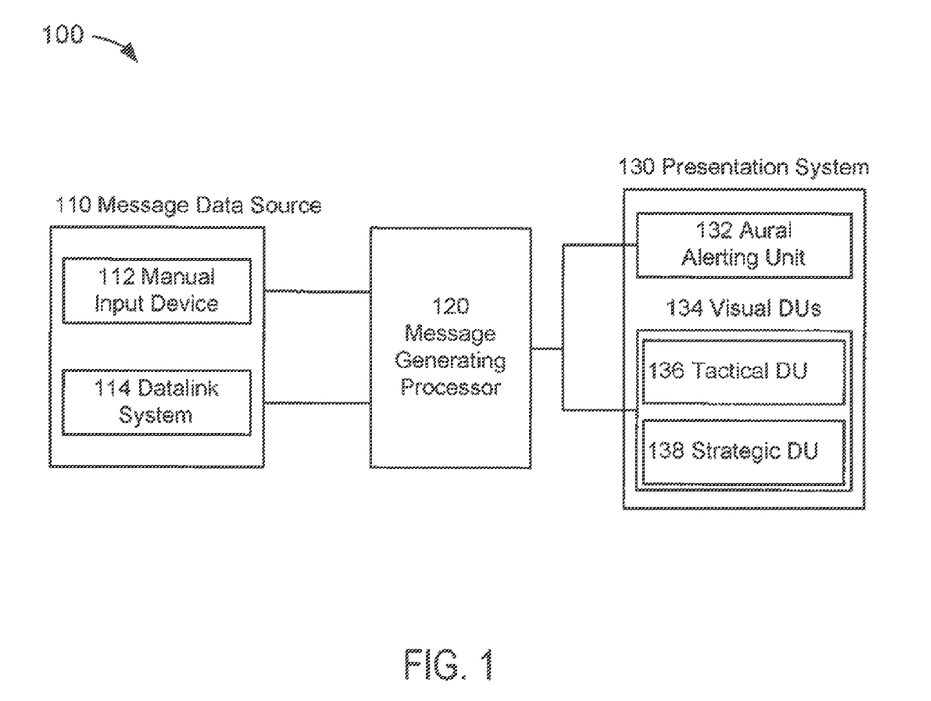
FIG. 1 depicts a block diagram of a message presentation system.

FIG. 1 depicts a block diagram of a message presentation system 100 suitable for implementation of the techniques described herein. The message presentation system 100 of an embodiment of FIG. 1 includes a message data source 110, a message generating processor 120, and a presentation system 130.

In an embodiment of FIG. 1, a message data source 110 could comprise any source of message data including, but not limited to, a manual input device 112 and/or a datalink system 114. A manual input device 112 could allow the pilot or flight crew to facilitate the entry of message data manually. Such devices could include, but are not limited to, a tactile device (e.g., keyboard, control display unit, cursor control device, touch screen device, etc. . . . ) and/or speech recognition systems. The use of a manual input device 112 could enable the pilot or flight crew to input message data via such device. In an embodiment of FIG. 1, data representative of a message could be provided to a message generating ("MG") processor 120 for subsequent processing as discussed herein.

A manual input device 112 may be part of a flight management system ("FMS"). A flight management system ("FMS") may perform a variety of functions performed to help the crew in the management of the flight; these functions are known to those skilled in the art. These functions could include receiving a flight plan and constructing a lateral and vertical flight plan from the flight plan. A pilot could create a flight plan from waypoints stored in a database or select a flight plan stored in a database of the FMS. Also, a flight plan may be modified at any time.

In a lateral flight plan, an FMS could perform many functions including, but not limited to, navigational computations, radio navigation aids selections, and providing lateral flight information which could maintain the aircraft along the flight plan from takeoff to landing. In a vertical flight plan, an FMS could compute an optimum speed at each point, other characteristic speeds, and the aircraft weight and center of gravity. Then, it could compute predictions along the flight plan based on these speeds and weight to, for example, minimize fuel consumption. It could also provide vertical flight information in reference to such predictions. Other miscellaneous performance computations are also made. Computations and underlying algorithms performed by an FMS are known to those skilled in the art.

A pilot or flight crew may initialize an FMS including, but not limited to, the selection of a flight plan, where such flight plan could provide the basis for all computations and displays. A flight plan may be composed of various lateral and vertical elements that may be defined during initialization, and may be defined from navigation data stored in an FMS database.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing fuel cost versus time cost information. The cost index could include a scale of optimization, where a low cost index may be associated with optimizing fuel consumption and a high cost index may be associated with optimizing time.

As noted above, a flight plan may be changed or revised at any time after initialization. For lateral elements, waypoints could be inserted or deleted, holding procedures could be inserted or modified, legs to fly directly to waypoints may be inserted, a DP or STAR procedure may be modified or introduced into the flight plan, the destination or alternate airport may be changed, and/or an offset path could be created to avoid hazardous meteorological conditions. For vertical elements, constraints associated with altitude, vertical speed, flight path angle, and speed between waypoints could be inserted, modified, or deleted; climb and descent speeds could be inserted, modified, or deleted as well as climb and descent step legs. Cruise flight levels and a cost index could be modified In an embodiment of FIG. 1, a message data source 110 could comprise a datalink system 114, where a datalink system includes those aircraft system(s) that receive data from sources external to the aircraft including, but not limited to, ground stations and satellites. A datalink system 114 is known to those skilled in the art. In an embodiment of FIG. 1, data representative of a message could be transmitted to the pilot or flight crew of an aircraft via a datalink system 114 which, in turn, could provide message data to an MG processor 120 for subsequent processing as discussed herein.

In an embodiment of FIG. 1, an MG processor 120 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An MG processor 120 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, an MG processor 120 could be a processor(s) used by or in conjunction with any other system of the aircraft including, but not limited to, a processor(s) associated with a message data source, an aural alert system 130, and a presentation system 130.

An MG processor 120 may be programmed or configured to receive as input data representative of information obtained from various systems and/or sources including, but not limited to, a message data source 110. As embodied herein, the terms "programmed" and "configured" are synonymous. An MG processor 120 may be electronically coupled to systems and/or sources to facilitate the receipt of input data; as embodied herein, operatively coupled may be considered as interchangeable with electronically coupled. An MG processor 120 may be programmed or configured to execute the methods discussed in detail below. An MG processor 120 may be programmed or configured to provide output data to various systems and/or units including, but not limited to, a presentation system 130. An MG processor 120 may be electronically coupled to systems and/or units to facilitate the providing of output data representative of a procedure. It is not necessary that a direct connection be made; instead, such receipt of input data and the providing of output data could be provided through a data bus or through a wireless network.

A presentation system 130 could be comprised of any presentation unit which may present the pilot with visual and/or aural indications regarding messages including, but not limited to, aural alerting unit 132 and/or visual display units 134. An aural alerting unit 132 may be any unit capable of producing and presenting any aural alerts. Aural alerts may be discrete sounds, tones, and/or verbal statements used to annunciate a condition, situation, or event. As embodied herein, aural alerts could be presented in combination with or simultaneous to the presenting of notes and/or visual alerts as discussed in detail below.

Visual display units 134 could be comprised of a tactical display unit(s) 136, and/or a strategic display unit(s) 138. A tactical display unit 136 could be any unit which presents tactical information to the crew relative to the instant or immediate control of the aircraft, whether the aircraft is in flight or on the ground. A tactical display unit 136 could be a Head-Down Display ("HDD") unit and/or a Head-Up Display ("HUD") unit. An HDD unit is typically a unit mounted to an aircraft's flight instrument panel located in front of a pilot and below the windshield and the pilot's field of vision. A HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot A tactical display unit 136 could display the same information found on a primary flight display ("PFD"), such as "basic T" information (i.e., airspeed, attitude, altitude, and heading). Although it may provide the same information as that of a PFD, a tactical display unit 136 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 136 is designed to provide flexible configurations which may be tailored to the desired configuration specified by a buyer or user of the aircraft.

A strategic display unit 138 could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed separately or simultaneously with information of other systems. In one embodiment herein, terrain information may be displayed simultaneously with weather information with no loss or a negligible loss of displayed information.

The drawings of FIG. 2 provide exemplary depictions of a strategic display unit 138 for presenting strategic information to the pilot or flight crew. The drawings of FIG. 2 provide exemplary depiction of how a plan comprising a series of waypoints a runway may be presented on a strategic display unit 138. For the purpose of discussing the advantages and benefits of the embodiments discussed, a proposed flight plan between JFK International Airport ("KJFK") in New York City, N.Y., United States and arriving in Ministro Pistarini international Airport ("SAEZ") in Buenos Aires, Argentina will be provided as an example. Those skilled in the art understand that flight plan information may be provided by an FMS and presented to the pilot on a: strategic display unit 138 as a series of waypoints such as shown in the drawings of FIG. 2. It should be noted that, although a flight plan only is depicted, those skilled in the art understand that a manufacturer or end-user may configure a strategic display unit 138 for simultaneously presenting other information such as, but not limited to, terrain and/or obstacle information, maps showing geopolitical boundaries, airspace boundaries, airspace boundaries, and weather. Although the discussion herein will be drawn to a depiction of one illustrative flight plan, the embodiments are not limited to strategic display unit 138 that depicts flight plans only.

The drawings of FIG. 2 depict two different times along two phases of the flight plan. For the first phase of the flight plan, FIG. 2A depicts an aircraft 152 located at KJFK. As shown, the first phase of the flight plan comprises the following existing waypoints after KJFK: AZEZU (37° 52' 28" N 72° 22' 43" W), PAEPR (35° 02' 31" N 72° 25' 00" W), LAMER (25° 00' 00" N 70° 03' 056" W), ASIVO (19° 57' 36" N 69° 41' 33" W), and TEKOL (16° 00' 00" N 69° 06' 54" W). In addition to the flight plan, a cursor 154 is depicted, where such cursor may be controlled by a pilot using means known to those skilled in the art including, but not limited to, a cursor control device. As embodied herein, an airport may be considered a waypoint.

Figure 2A:
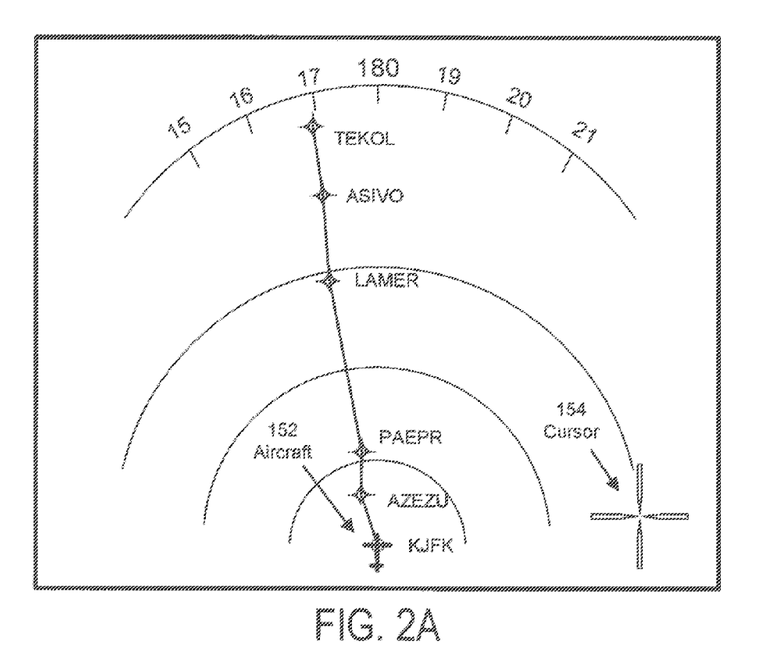
Figure 2B:
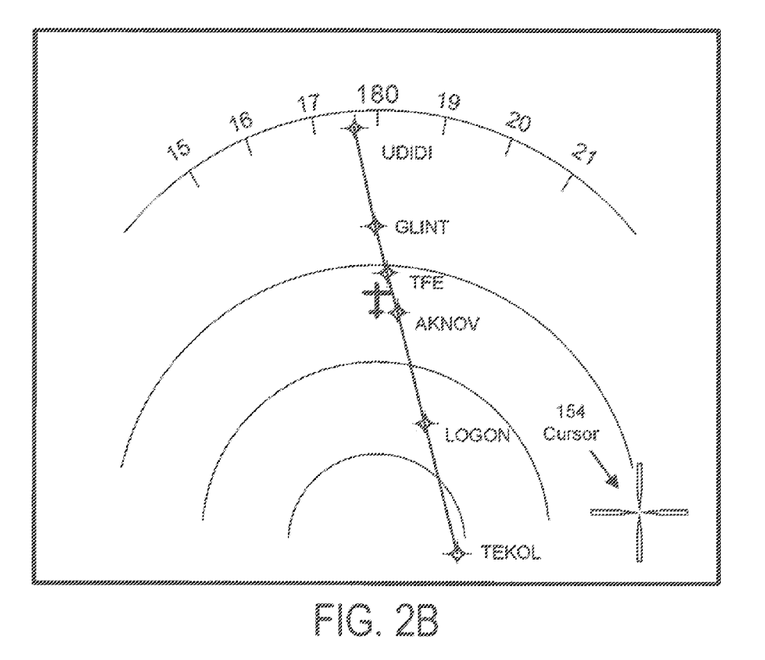

Along with cursor 154, the second phase of the flight plan is depicted in FIG. 2B, where such flight plan comprises the following existing waypoints after TEKOL: LOGON (06° 33' 22" N 66° 58' 18" W), AKNOV (00° 50' 33" S 65° 20' 46" W), TFE (03° 23' 16" S 64° 43' 41" W), GLINT (06° 27' 26" S 63° 58' 12"W), and UDIDI (13° 02' 36" S 62° 37' 24" W); UDIDI will be assumed to be the last waypoint over Brazil before aircraft crosses the Brazil-Bolivia border. As observed, the aircraft depicted in FIG. 2B is located along the flight plan between AKNOV and TFEA. It should be noted that waypoint information illustrated herein may have been modified for the sake of illustration, and as such, is not suitable for navigation.

During the flight when the aircraft is located between AKNOV and TFEA as depicted in FIG. 2B, assume the pilot or flight crew receives a communication to contact Bolivian border patrol on VHF frequency 129.52 ten minutes prior to crossing into Bolivia. Assuming that UDIDI is near the Brazil-Bolivia border, the pilot may elect to use UDIDI for the purpose of create a message based on a time offset of a waypoint for the purpose of creating a message.

Figure 2C:
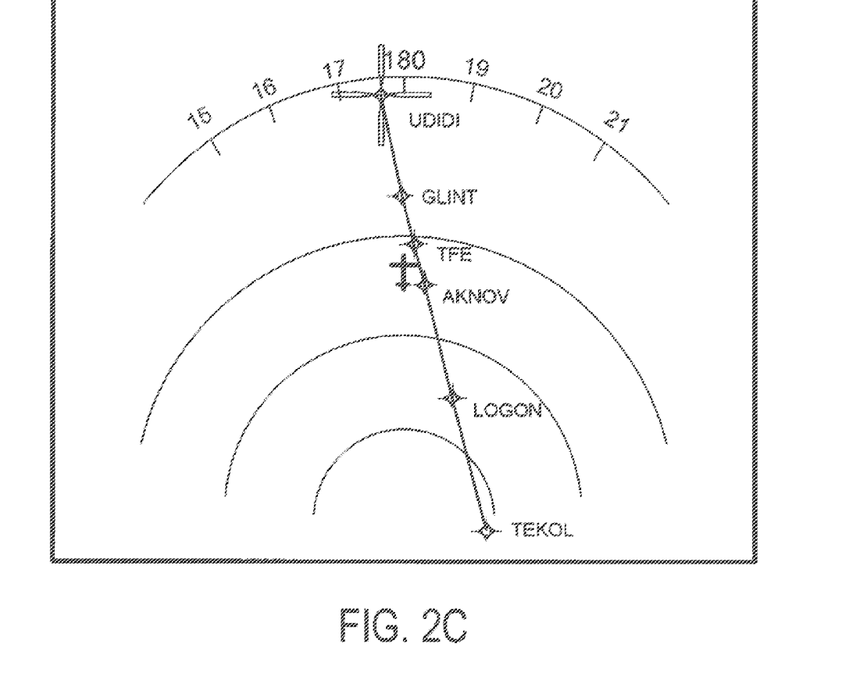
Figure 2D:
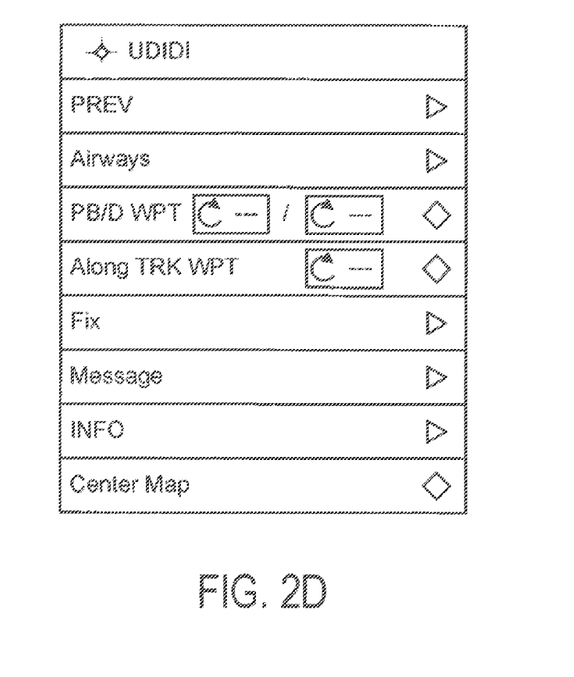
FIG. 2D depicts a waypoint menu.

As depicted in FIG. 2C, the pilot may point to or place the cursor over UDIDI and cause it to be selected. When selected, a menu entitled UDIDI such as the one depicted in FIG. 2D may appear. Although this example assumes the use of a cursor, the embodiments herein are not limited to cursor selection means but could include any means of selecting a waypoint. With the exception of the "Message" choice box, the other choice and dialog boxes shown in FIG. 2D are known to those skilled in the art. As such, a discussion of the specific information shown is not provided herein.

Figure 2E:
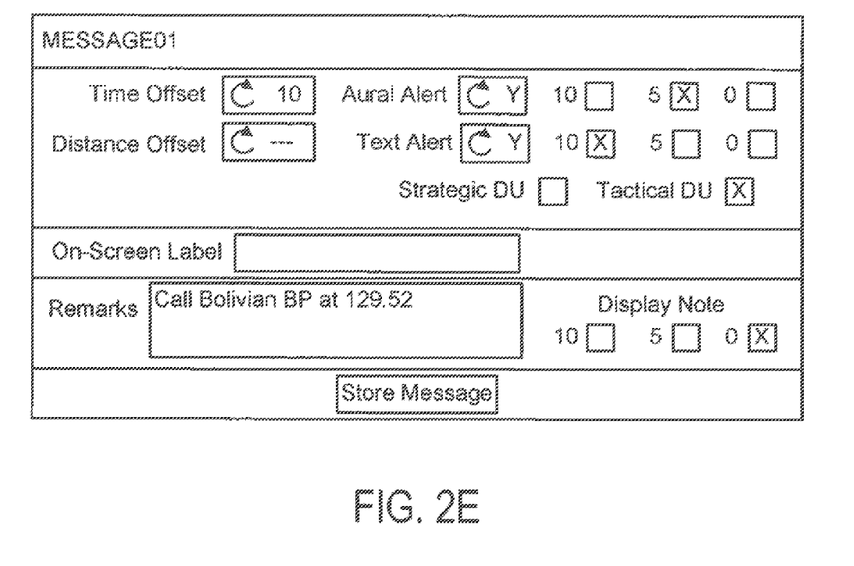

Because the pilot has elected to create a time offset-based message, the pilot may point to or place the cursor over "Message" and select it. Once the pilot has selected "Message," a message dialog box entitled MESSAGE01 such as the one depicted in FIG. 2E may appear. As illustrated in FIG. 2E, the pilot may create a time offset-based message for UDIDI by entering "10" for the time of 10 minutes in the field labeled "Time Offset"; although the clockwise arc indicates the use of a rotary knob for manually dialing in the offset, the embodiments herein are not limited to the use of a knob but could include any means for entering the information. The pilot has elected to have an aural alert presented five minutes before arriving at the message location by selecting "Y" for yes in the "Aural Alert" field and selecting the box next to the "5" field. Also, the pilot has elected to have a text alert presented on a strategic display unit ten minutes before arriving at the message location by selecting "Y" for yes in the "Text Alert" field and selecting the boxes next to the "10" and "Strategic DU" fields. Because the pilot has elected not to enter information in the "On-Screen Label" field, a label will not be included with the message object presented on the display unit. The pilot has elected to have a note appear upon arrival at the message location by entering "Call Bolivian BP at 129.52" in the "Remarks" field and by selecting the box next to the "0" field. When the pilot has finished making the entries, he or she may select "Store Message" to enable the presentation of the note.

Although the example calls for a time offset-based message, messages may be based upon other criteria. In another embodiment, if the Bolivian border patrol requested the pilot to contact it 200 NM from UDIDI, the pilot may create a message based on a distance offset of a waypoint for UDIDI by pointing to or placing the cursor over "Message" of FIG. 2D and selecting it. When a message dialog box of FIG. 2F appears, the pilot may create a distance offset-based message for UDIDI by entering "200" for the distance of 200 NM the field labeled "Distance Offset." As for the other fields, the pilot has made the same elections of the preceding paragraph as indicated by the other fields corresponding to "Distance Offset" in FIG. 2F.

Figure 2F:
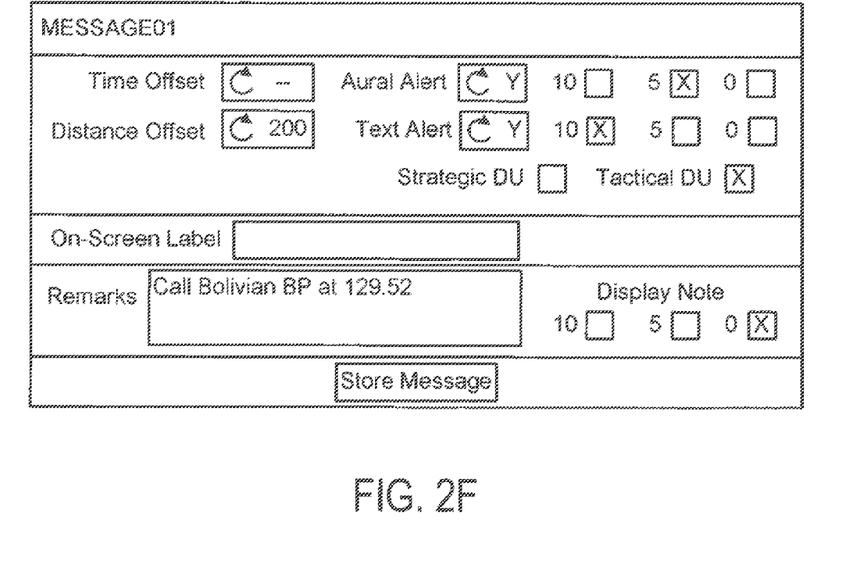

In another embodiment, a pilot or originator may elect to enter a message based on the time of day. For example, if the Bolivian Border Patrol requested that it be contacted at a specific time, a pilot could select a point on the flight plan. For example, a pilot could point-and-click to a point on the flight plan using a cursor. If such a selection is made, a message dialog box as illustrated in FIGS. 2E and 2F may appear but without the "Time Offset" and "Distance Offset" fields; instead, a time of day field could be displayed in which the pilot may enter a time and make one or more elections of the other fields as necessary. Once this information has been stored, the location of the message on the flight plan that corresponds to the stored time may be determined.

In another embodiment, a pilot or originator may elect to enter a message based on latitude/longitude. If such a selection is made, a message dialog box as illustrated in FIGS. 2E and 2F may appear but without the "Time Offset" and "Distance Offset" fields; instead, a latitude/longitude field(s) could be displayed in which the pilot may enter a latitude/longitude and make one or more elections of the other fields as necessary. Once this information has been stored, the location of the message on the flight plan that corresponds to the stored time may be determined.

Once the message has been stored, message object may appear in the location that corresponds to the pilot's entries. In an embodiment of FIG. 2G, message object 162 has been depicted graphically as a push-pin. In this example, the location of message object 162 is the message location, i.e., where the aircraft will be 10 minutes from UDIDI. As embodied herein, message object 162 is not limited to a push-pin but may be configured to take the shape or form as selected or chosen by a manufacturer or end-user. Those skilled in the art will appreciate the ability and ease with which executable software code may be reprogrammed or modified by a manufacturer or end-user to facilitate a configuration change of message object without affecting or expanding the scope of the embodiments discussed herein.

Figure 2G:
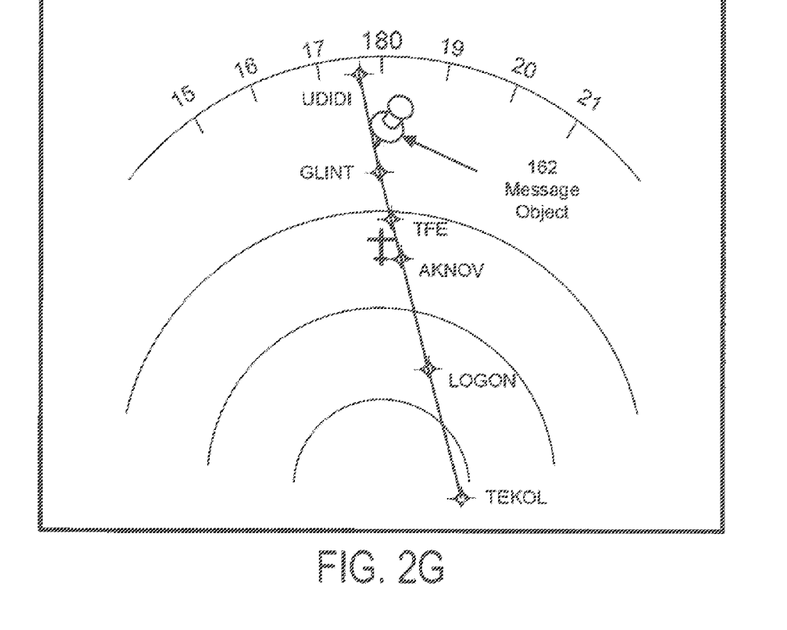
FIG. 2G provides an exemplary depiction of a message object on the flight plan presented on a strategic display unit.

As discussed above, information could have been entered into the "On-Screen Label" field, but the pilot elected not to. As embodied herein, information entered into such field could be made part of the message object 162 and presented next to it. Alternatively, information entered into the "Remarks" field could be displayed in a plurality of ways. In one embodiment, the information contained in "Remarks" field "Call Bolivian BP at 129.52" could appear upon the occurrence of a "mouseover" or "hover box" while a cursor is held over the message object 162. In another embodiment, the information contained in "Remarks" field could appear by selecting or clicking on the push-pin.

A message object could include enhancing effects such as, but not limited to, shading, transparency, translucency, opacity, texture-mapping, bump-mapping, fogging, shadowing, patterns, colors, or any combination thereof. As embodied herein, a message object may be configured to change appearances upon the occurrence(s) of predetermined and/or configurable events. In one example, a message object could be enhanced by color, and such color could depend on the distance and/or time between the message location and the aircraft, where each color could represent a specific range and/or time to the message location. In another example, a message object could remain steady or flash intermittently, where such flashing could depend on the distance between the object and the aircraft, where such flashing could represent a specific range to the message location.

Figure 2H:
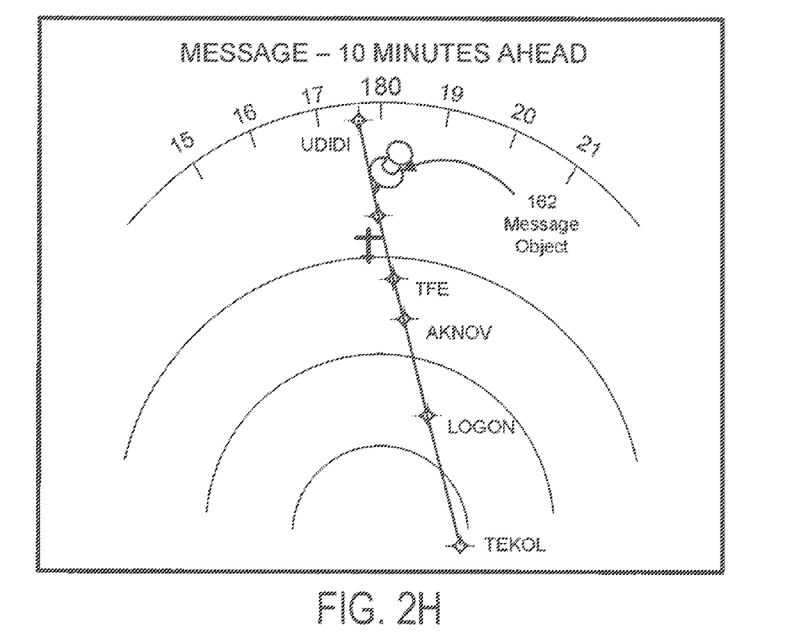
FIG. 2H provides an exemplary depiction of a message object on the flight plan and a visual alert presented on a strategic display unit.

In an embodiment of FIG. 2H, the aircraft has arrived at a location 10 minutes away from the message location indicated by message object 162. As stated above, the pilot has elected to have a text alert presented on a strategic display unit ten minutes before arriving at the message. As illustrated in FIG. 2H, text alert "MESSAGE—10 MINUTES AHEAD" has been generated and presented on the display unit. Had the pilot elected another time, the message could be presented according to the pilot's election.

In another embodiment, the information entered by the pilot could be textually presented on the display unit. For example, text messages such as "CALL BOLIVIAN BP AT 129.52 IN 10 MINUTES" could be generated and presented. In another embodiment, a text message could be enhanced by color, and such color could depend on the distance and/or time between the message location and the aircraft, where each color could represent a specific range and/or time to the message location. In another embodiment, a text message could remain steady or flash intermittently, where such flashing could depend on the distance between the object and the aircraft, where such flashing could represent a specific range to the object.

Aural alerts may be discrete sounds, tones, and/or verbal statements used to annunciate a condition, situation, or event that has predetermined and/or configured by a manufacturer or end-user. In one example, a single tone could chime, where the choice of a tone could depend on the distance and/or time between the message location and the aircraft, where different tones or sounds could represent a specific range and/or time to the message location. Such tones or sounds could occur infrequently at longer distances from the message location and increase in frequency as the aircraft approaches the message location. As stated above, the pilot has elected to have an aural alert presented five minutes before arriving at the message location. As such, an aural alert "MESSAGE—5 MINUTES AHEAD" could be generated and presented to the pilot. In another example, the stored information could be aurally presented on the display unit if configured to convert word recognition to speech. For example, an aural message such as "CALL BOLIVIAN BP AT 129.52 IN 5 MINUTES" could be generated and Presented. It should be noted that each of these examples of text and aural alerts are intended to provide examples of the embodiments disclosed herein, and are not intended to provide a limitation or an exhaustive list to the embodiments discussed herein.

Figure 2I:
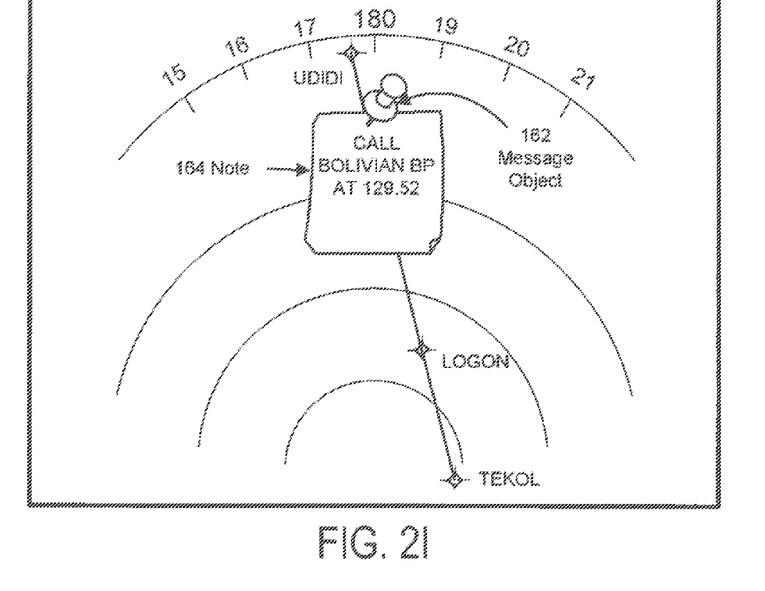
FIG. 2I provides an exemplary depiction of a message object on the flight plan and a note presented on a strategic display unit.

In an embodiment of FIG. 2I, the aircraft has arrived at the message location indicated by message object 162. As stated above, the pilot has elected to have a note appear upon arrival at the message location. As illustrated in FIG. 2I, note 164 with text "CALL BOLIVIAN BP AT 129.52" has been generated and presented on the display unit. As illustrated in FIG. 2I, note 164 has been depicted as a Post-It® Note manufactured by 3M. As embodied herein, note 164 is not limited to a Post-It Note but may be configured to take any shape or form of a note as selected or chosen by a manufacturer or end-user.

In an embodiment of FIG. 2I, note 164 includes the remark information discussed above. As embodied herein, the contents presented on the note 164 is configurable by a manufacturer or end-user and could include data associated with the entry but transparent to the pilot.

Figure 3A:
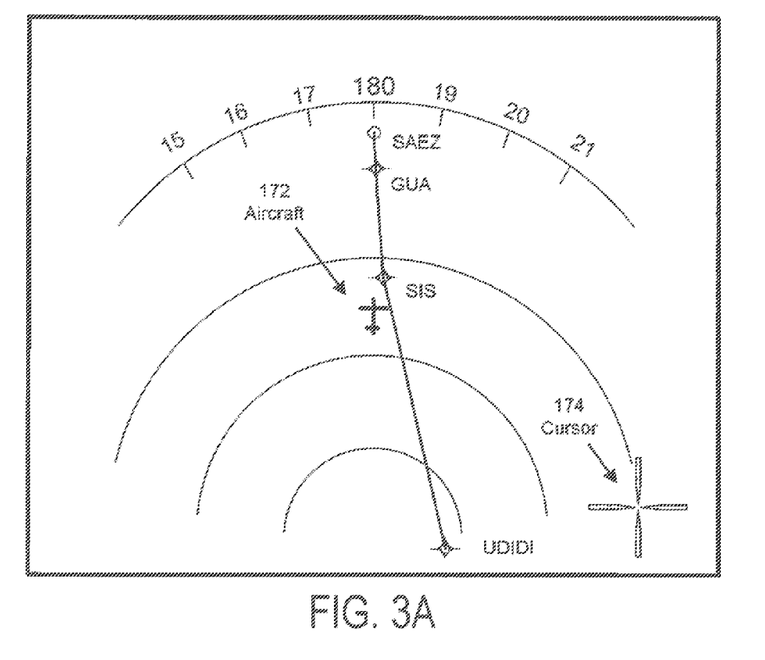
FIG. 3A provides an exemplary depiction of a flight plan presented on a strategic display unit.
Figure 3B:
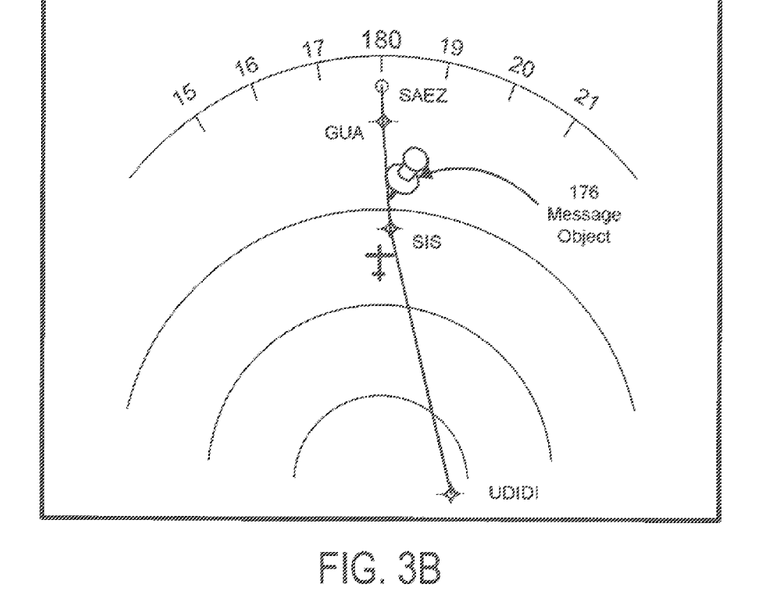
FIG. 3B provides an exemplary depiction of a message object on the flight plan presented on a strategic display unit.
Figure 3C:
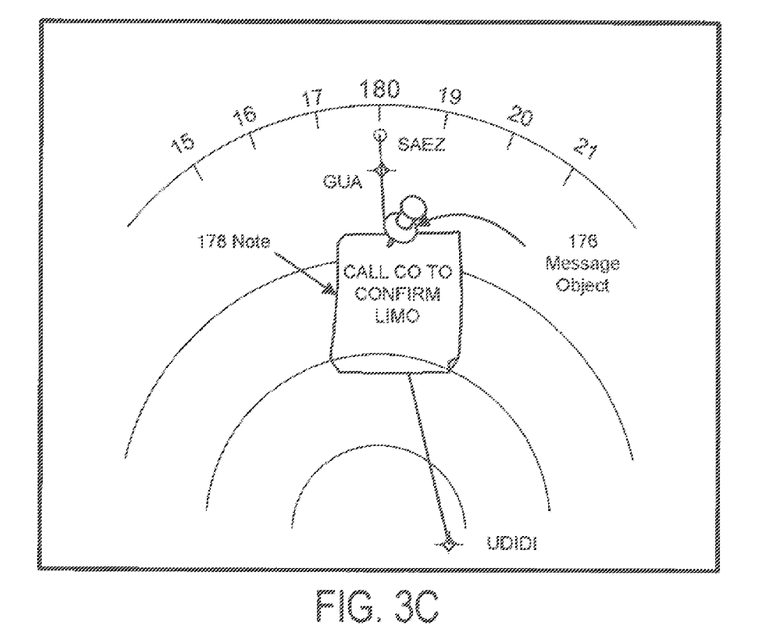
FIG. 3C provides an exemplary depiction of a message object on the flight plan and a note presented on a strategic display unit.

The drawings of FIG. 3 depict an aircraft 172 along the third phase of the flight plan. Along with cursor 174, the depicted flight plan comprises the following existing waypoints between UDIDI and the destination of SAEZ: SIS (27° 26' 49" S 59° 03' 26" W) and GUA (33° 00' 40" S 58° 36' 50" W). As observed, aircraft 172 depicted in FIG. 3A is located along the flight plan between UDIDI and SIS.

In an embodiment of FIG. 3B, it is assumed that message has been received through a datalink system 114. In this example, the message originator has generated a distance offset-based-message for SAEZ reminding the pilot to call the company 80 NM out from SAEZ to confirm the need for a limousine. In originating the message, the originator has elected to present an aural alert five minutes before arriving at the message location, where the message could be formatted with a "Y" in a field corresponding to an "Aural Alert" field and "5" in a field corresponding to a time. The originator has not elected to present either a visual alert or textual information included with the message object. The originator has elected to have a note appear upon arrival at the message location by entering "Call Co to Confirm Limo," where the message could been formatted with the message in a field corresponding to the "Remarks" field and "5" in a field corresponding to the "Display Note" time.

At the same time the message was received through the datalink system 114, a visual alert in the form of an object presented on a visual display unit and/or an aural alert such as a sound or chime could have been presented to draw the pilot's attention of the new message. Knowing of the new message, the pilot could thereafter select the object to display a dialog box and the content of the fields corresponding to the message, where the fields could be the same as depicted in FIGS. 2E and 2F because the message is a distance offset-based message. After reviewing the content of the fields and making any changes as desired, the pilot could accept the message, which may result in the presenting of message object 176 as depicted in FIG. 3B. Alternatively, the pilot could reject the message.

In an embodiment of FIG. 3C, the aircraft has arrived at a location 5 minutes away from the message location indicated by message object 176. Assuming that the pilot has not changed the content of the fields of the election box selected by the originator, note 178 with text "CALL CO TO CONFIRM LIMO" has been generated and presented on the display unit as illustrated in FIG. 3C; simultaneously, an aural alert such as "MESSAGE—5 MINUTES AHEAD" has be generated and presented to the pilot.

As discussed above, messages could be received through manual input 112 or through a datalink system 114. In an additional embodiment herein, messages may be stored in a database. Those skilled in the all know that an FMS database may store one or more predefined flight plans created by a manufacturer or end user. As embodied herein, message(s) may be incorporated into the predefined flight plan. As such, when the pilot has selected a predefined flight plan with an incorporated message(s), such message(s) may be included in the presentation of the flight plan.

Figure 4:
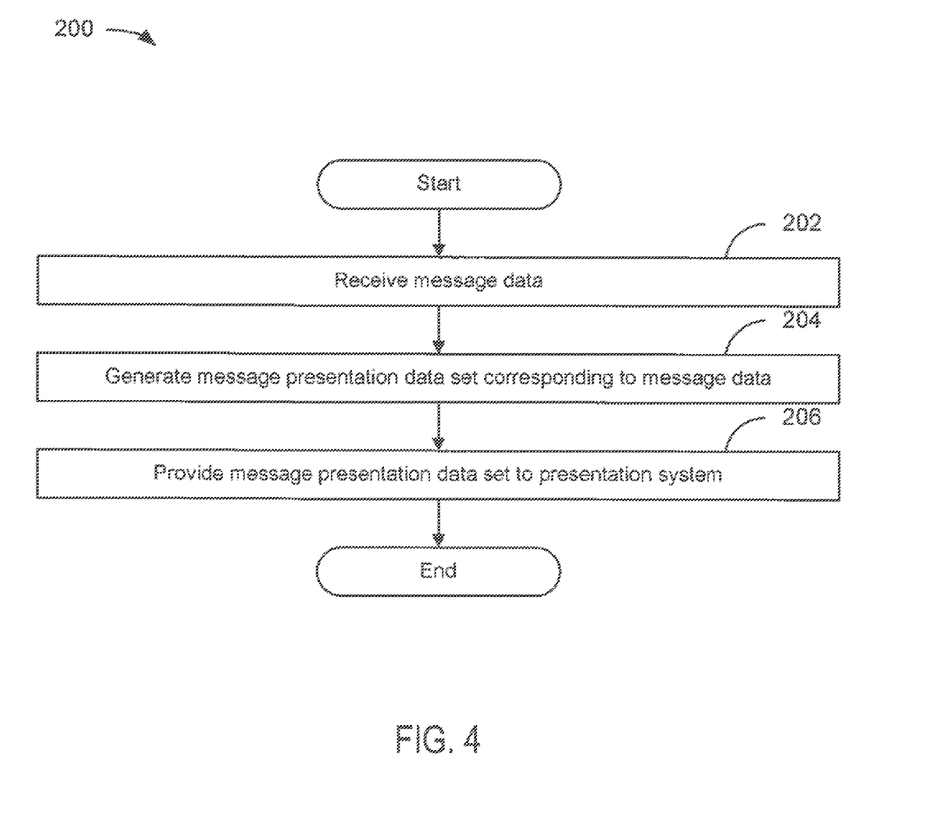
FIG. 4 depicts a flowchart of a method for presenting messages to the pilot of an aircraft.

FIG. 4 depicts a flowchart 200 of an example of a method for presenting messages to a pilot of an aircraft. The flowchart begins with module 202 with the receiving of data representative of a message received from a message data source. In one embodiment, a source of message data may be comprised of a manual entry device 112. In another embodiment, a source of message data may be comprised of a datalink system 114. In another embodiment, a source of message data may be comprised of an FMS database. In another embodiment, a source of message data may be comprised of any combination of the preceding sources.

As embodied herein, message data could include a message location, where the identity of such message could include, but is not limited to, a time offset of a waypoint, as a distance offset to a waypoint, or as a specified time on the flight plan. Additionally, message data could include a message corresponding to one or more modes of presentation. In one embodiment, a mode of presentation for a message could comprise a note, where the note may be configured to display remarks and/or change appearances upon the occurrence(s) of predetermined and/or configurable events. In another embodiment, a mode of presentation for a message could comprise aural alert, where such alert could be presented at one or more times elected by the pilot or originator of the message. In another embodiment, a mode of presentation for a message could comprise a text alert, where the text alert may be configured to change appearances upon occurrence(s) of predetermined and/or configurable events; additionally, the text alert could be presented on a tactical display unit, strategic display unit, or both at one or more times elected by the pilot or originator of the message. In another embodiment, a mode of presentation for a message may comprise any combination of the preceding modes of presentation.

The flowchart continues with module 204 with the generating of a message presentation data set corresponding to the message data. As embodied herein, the message presentation data set could be representative of a message object at the message location, where a message object may comprise a graphical object presenting a visual image. In another embodiment, message object may provide the functionality of a "mouseover" or "hover box" and/or a graphical user interface upon which a pilot may select or click to receive message information. In another embodiment, message object may be configured to change appearances upon the occurrence(s) of predetermined and/or configurable events. In another embodiment, the message object presented on a visual display unit could include an on-screen label.

As embodied herein, the message presentation data set could be representative of one or more messages, where each message corresponds to a mode of presentation. As embodied herein, the generation of the message presentation data set could depend upon the presentation unit on or through which the message will be presented.

The flowchart continues with module 206 with the providing of the message presentation data set to a presentation system. As embodied herein, a message object could be displayed on a visual display unit. In one embodiment, a push-pin could be displayed.

As embodied herein, a message could be presented on a presentation unit applicable to the mode of presentation of the message. If the mode of presentation of the message is a note, the applicable presentation unit could be a visual display unit on which the message could be presented. In one embodiment, a Post-It Note® could be depicted on a visual display unit. If the mode of presentation is a text alert, the applicable presentation unit could be a visual display unit on which the message could be presented. In the mode of presentation is an aural alert, the applicable presentation unit could be a aural alert unit through which the message could be presented. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting messages to a pilot of an aircraft, such system comprising:
   a source for providing message data;
   a message generating processor, wherein such processor
      receives message data, wherein such message data includes data representative of a message location on a flight plan and, at least one presentation mode,
      generates a message presentation data set corresponding to the message data, where the message presentation data set is representative of a message object having a message location and at least one message corresponding to a mode of presentation, and
      provides the message presentation data set to a presentation system; and
   the presentation system, wherein such system
      receives the message presentation data set, and
      presents the message object on the flight plan depicted on at least one visual display unit and each message on or through a presentation unit applicable to the mode of presentation.

2. The system of claim 1, wherein the source for providing message data is a manual entry device, a datalink system, or both.

3. The system of claim 1, wherein the message location is identified as
   a time offset of a waypoint,
   a distance offset of a waypoint,
   a location on the flight plan corresponding to a time, or
   a latitude/longitude.

4. The system of claim 1, wherein
   the mode of presentation for the message is a note, and
   the applicable presentation unit is a visual display unit.

5. The system of claim 1, wherein
   the mode of presentation for the message is a text alert, and
   the applicable presentation unit is a visual display unit.

6. The system of claim 1, wherein
   the mode of presentation for the message is an aural alert, and
   the applicable presentation unit is an aural alert unit.

7. The system of: claim 1, wherein the message object includes an on-screen label.

8. The system of claim 1, wherein the message generating processor is a processor of the source for providing message data or the presentation system.

9. A module for presenting messages to a pilot of an aircraft, such module comprising:
   an input communications interface to facilitate the receiving of data by a processor from at least one data source;
   a message generating processor, wherein such processor
      receives message data, wherein such message data includes data representative of a message location on a flight plan and at least one presentation mode,
      generates a message presentation data set corresponding to the message data, where the message presentation data set is representative of
         a message object having a message location, and
         at least one message corresponding to a mode of presentation, and
      provides the message presentation data set to a presentation system, whereby the message object is presented on the flight plan depicted on at least one visual display unit and each message is presented on or through a presentation unit applicable to the mode of presentation; and
   an output communications interface to facilitate the providing of the message presentation data set to the presentation system.

10. The module of claim 9, wherein the message location is identified as
   a time offset of a waypoint,
   a distance offset of a waypoint,
   a location on the flight plan corresponding to a time, or
   a latitude/longitude.

11. The module of claim 9, wherein
   the mode of presentation for the message is a note, and
   the applicable presentation unit is a visual display unit.

12. The module of claim 9, wherein
the mode of presentation for the message is a text alert, and
the applicable presentation unit is a visual display unit.

13. The module of claim 9, wherein
the mode of presentation for the message is an aural alert, and
the applicable presentation unit is an aural alert unit.

14. The module of claim 9, wherein the message object includes an on-screen label.

15. The module of claim 9, wherein the module is a module of a source for providing message data or the presentation system.

16. A method for presenting messages to a pilot of an aircraft, such method comprising:
 receiving message data, wherein such message data includes data representative of a message location on a flight plan and at least one presentation mode;
 generating a message presentation data set corresponding to the message data, where the message presentation data set is representative of
  a message object having a message location, and
  at least one message corresponding to a mode of presentation; and
 providing the message presentation data set to a presentation system, whereby the message object is presented on the flight plan depicted on at least one visual display unit and each message is presented on or through a presentation unit applicable to the mode of presentation.

17. The method of claim 16, wherein the message location is identified as
 a time offset of a waypoint,
 a distance offset of a waypoint,
 a location on the flight plan corresponding to a time, or
 a latitude/longitude.

18. The method of claim 16, wherein
the mode of presentation for the message is a note, and
the applicable presentation unit is a visual display unit.

19. The method of claim 16, wherein
the mode of presentation for the message is a text alert, and
the applicable presentation unit is a visual display unit.

20. The method of claim 16, wherein
the mode of presentation for the message is an aural alert, and
the applicable presentation unit is an aural alert unit.

21. The method of claim 16, wherein the message object includes an on-screen label.

\* \* \* \* \*